(12) United States Patent
Anderson

(10) Patent No.: US 7,384,056 B2
(45) Date of Patent: Jun. 10, 2008

(54) FIFTH WHEEL COUPLER RELEASE APPARATUS

(76) Inventor: Russ Cameron Anderson, 12739 State Highway 11, Greenbush, MN (US) 56726

( * ) Notice: Subject to any disclaimer, the term of this patent is extended or adjusted under 35 U.S.C. 154(b) by 379 days.

(21) Appl. No.: 11/206,611

(22) Filed: Aug. 18, 2005

(65) Prior Publication Data

US 2007/0182126 A1 Aug. 9, 2007

(51) Int. Cl.
*B62D 53/06* (2006.01)
(52) U.S. Cl. ........................... 280/441; 280/433
(58) Field of Classification Search ............... 280/441, 280/433
See application file for complete search history.

(56) References Cited

U.S. PATENT DOCUMENTS

| | | | | |
|---|---|---|---|---|
| 2,469,279 A | * | 5/1949 | Seyferth | 280/435 |
| 3,013,815 A | * | 12/1961 | Geerds | 280/435 |
| 4,592,566 A | * | 6/1986 | Inoue et al. | 280/433 |
| 4,946,183 A | * | 8/1990 | Benson et al. | 280/434 |
| 5,863,060 A | * | 1/1999 | Hollis et al. | 280/433 |
| 6,092,825 A | * | 7/2000 | Flater | 280/433 |
| 6,095,544 A | * | 8/2000 | Flater | 280/434 |
| 6,100,794 A | * | 8/2000 | Hillier | 340/431 |
| 6,179,316 B1 | * | 1/2001 | Sibley, Jr. | 280/434 |
| 6,402,176 B1 | * | 6/2002 | Timmings | 280/433 |
| 6,935,664 B2 | * | 8/2005 | McGrew et al. | 294/26 |
| 7,140,632 B2 | * | 11/2006 | Alguera et al. | 280/433 |
| 2003/0127826 A1 | * | 7/2003 | Clemence | 280/433 |
| 2004/0145150 A1 | * | 7/2004 | Yeakel | 280/433 |
| 2006/0103109 A1 | * | 5/2006 | Flater | 280/433 |

\* cited by examiner

*Primary Examiner*—Lesley D. Morris
*Assistant Examiner*—Michael Stabley

(57) ABSTRACT

This fifth wheel coupler release apparatus for adding to a fifth wheel hitch. The fifth wheel coupler provides a manner of releasing the coupling mechanism of a fifth wheel from a more accessible position and in a manner that can overcome any resistance through a lever arm type assembly.

5 Claims, 11 Drawing Sheets

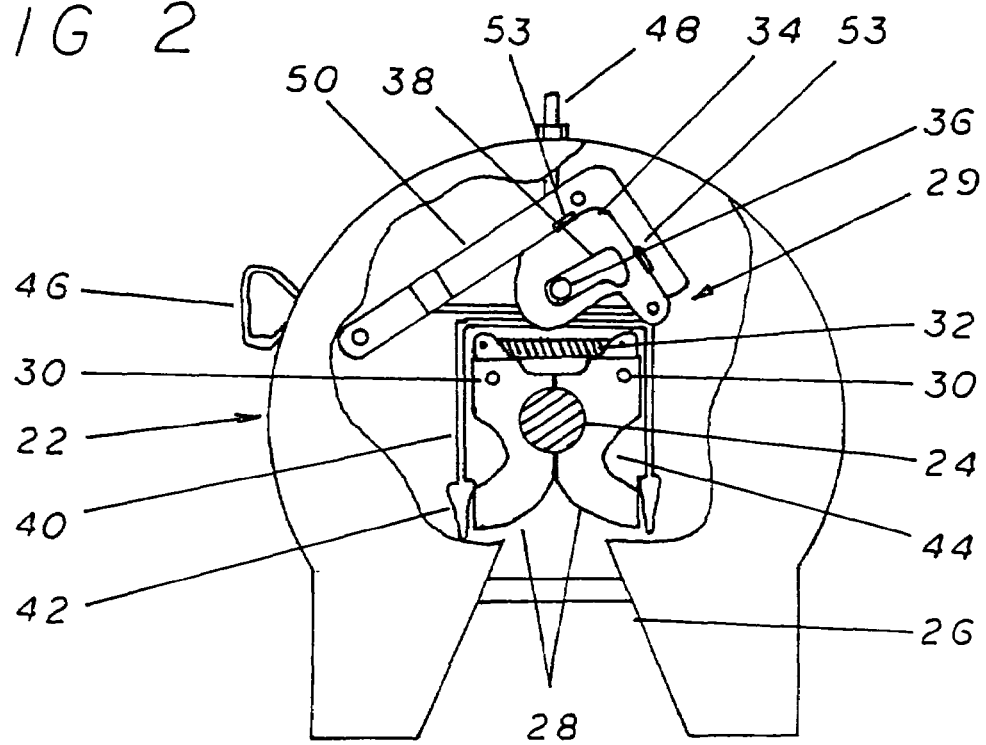
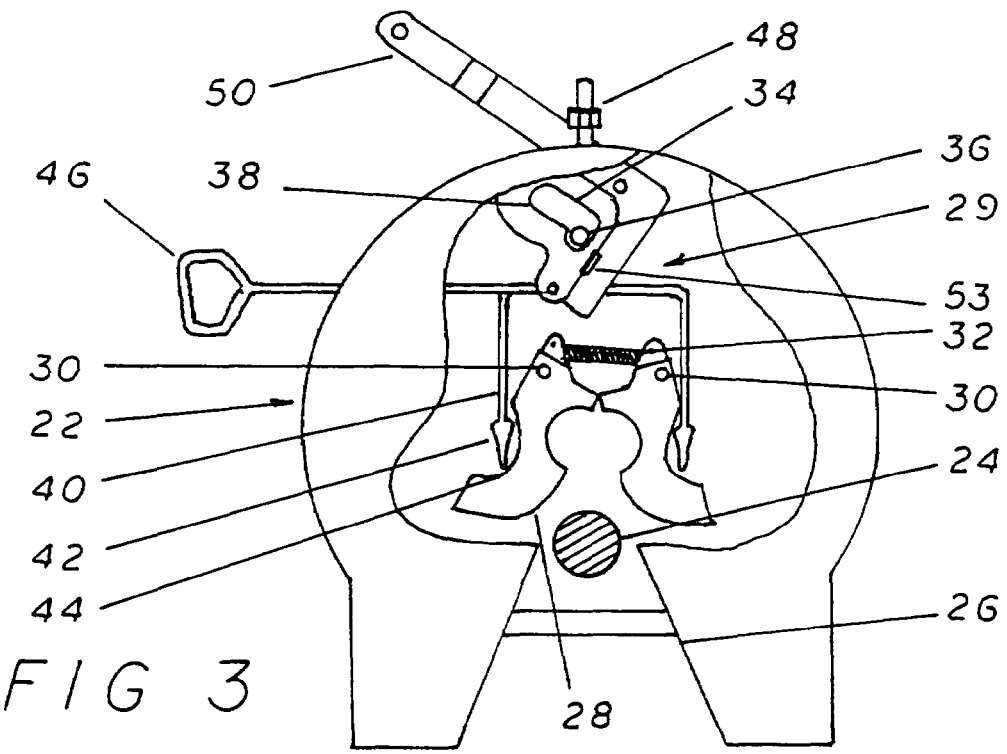

FIG 14
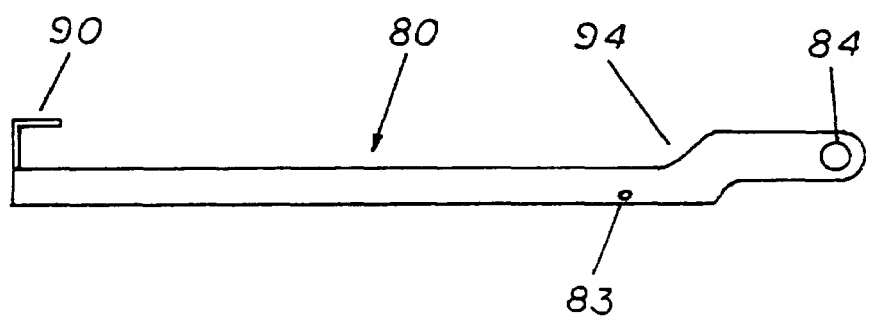
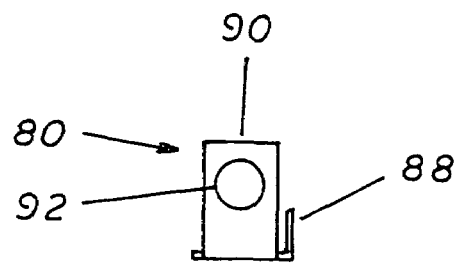
FIG 15

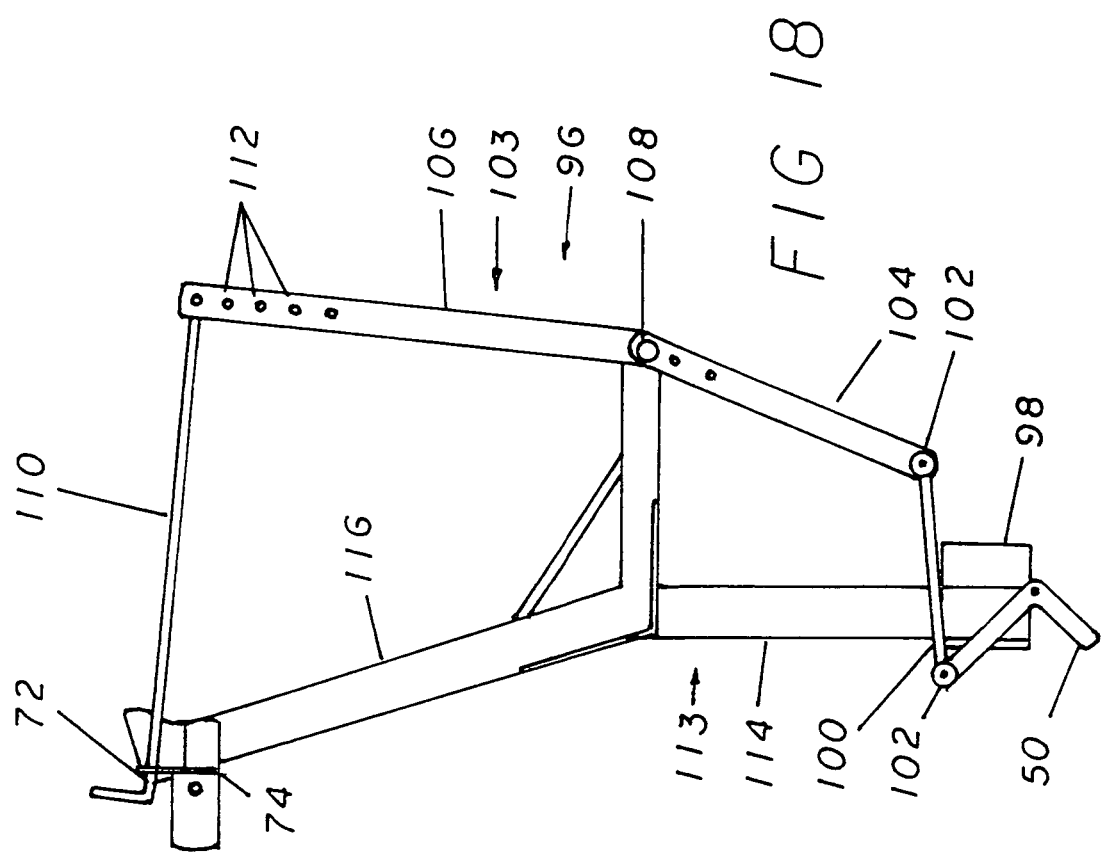
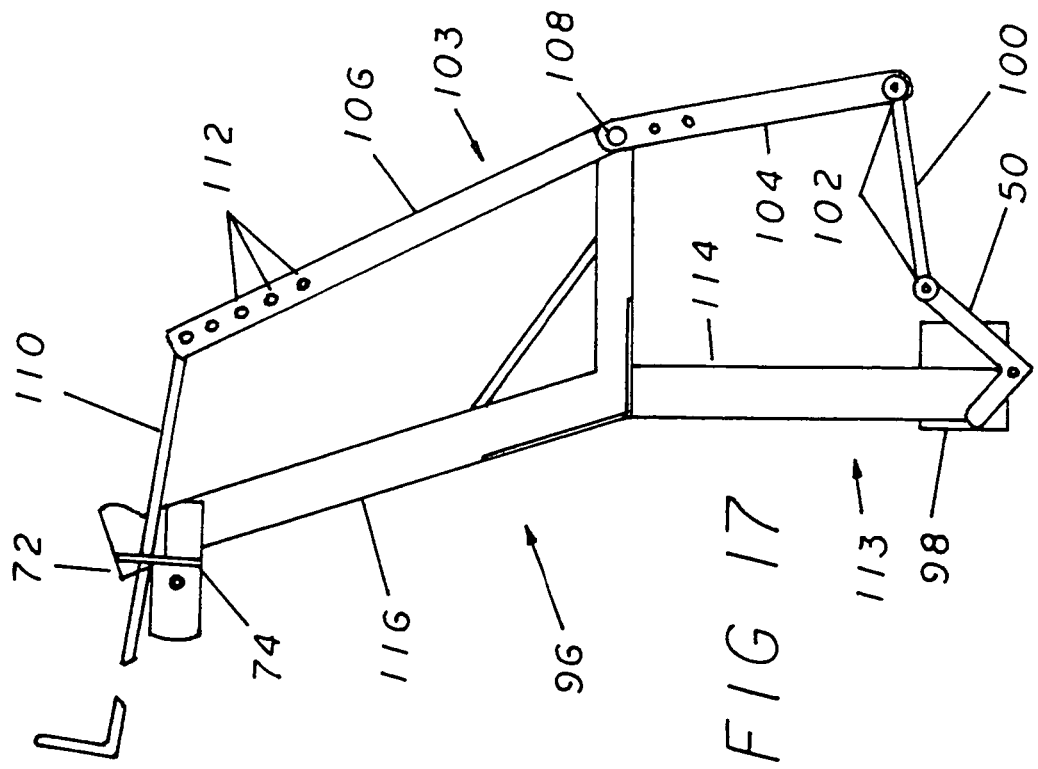

FIFTH WHEEL COUPLER RELEASE APPARATUS

BACKGROUND OF THE INVENTION

The present invention relates to an improvement in the mechanism employed to release fifth wheel coupling devices. More specifically, to an arm and lever mechanism employed with fifth wheel coupling devices which allows an operator to quickly and safely disengage a kingpin of a trailer from the coupler device thereby providing for the separation of a tractor from a trailer and allowing it to be either operated independently or connected to another trailer.

The use of fifth wheels as coupling devices in joining a trailer to a towing vehicle in an articulating manner is very common today. The uses of the fifth wheel in this application ranges from the connection of a recreational trailer to the bed of a pickup truck to the connection of large semi trailers to tractors, a configuration commonly referred to as an over the road truck.

In the case of the latter application, the fifth wheel is commonly made up of a relatively large circular plate-like apparatus that is pivotally mounted to the frame of a tractor in a position that is roughly over the drive wheels. The surface of the fifth wheel is additionally equipped with an open slot that bisects its rearward half. It is this slot in the fifth wheel that provides for the connection of the semi trailer to the tractor.

This connection is facilitated by the use of a kingpin that extends downward from the forward lower surface of the trailer from roughly the center of an additional generally circular plate. The kingpin is a cylindrical apparatus which has the primary function of engaging the fifth wheel. This is accomplished by maneuvering the tractor so that the kingpin passes into the open slot of the fifth wheel. In this procedure, as the kingpin enters the central portion of the fifth wheel, it is engaged by a spring loaded locking jaw apparatus. The kingpin plate then engages the fifth wheel plate in a slidable manner. Additionally, a layer of grease is commonly positioned between the kingpin and fifth wheel plates to ensure their proper operation during use.

This locking apparatus effectively holds the kingpin (and therefore the semi trailer) in the desired location relative to the tractor while allowing the semi trailer to pivot in relation to the tractor. The pivotal nature of the connection afforded by the use of the fifth wheel allows the tractor/trailer configuration to articulate during operation. This ability of the tractor/trailer combination as it allows them to negotiate streets and roads that an unarticulated vehicle of equal length and capacity could not.

The release of the above described connection is accomplished through the use of a drop handle that protrudes from one side of the fifth wheel. The drop handle is connected to the locking jaws and, when engaged, operates to open the lock jaws thereby releasing the kingpin. Once this has been accomplished, the tractor is then free to move off and engage a different semi trailer.

While this system has been employed for a long time with relatively good success, it does suffer from inadequacies most of which result from the design of the release mechanism, the drop handle. The first of these is a direct result of the location of the drop handle on the side of the fifth wheel. The problem of this is one of accessibility. That is to say, because of its location, it can be difficult for the operator of the tractor to reach in commonly over the drive tires and under the trailer and disengage the fifth wheel by the use of the drop handle. This can be difficult in normal circumstances and only becomes more so in adverse weather conditions such as wind, rain, and snow.

Another problem associated with the drop handle is some circumstances can result in the interference with its release function. Typically, the circumstances leading to this are age and wear of the operational components increasing the effort needed to release the lock jaws, dirt and grit also causing the operator to use more force to operate it, and snow and ice jamming the mechanisms or making it difficult to grasp and operate the drop handle. All of the above described deficiencies of the coupling apparatus of the commonly used fifth wheel also present safety concerns as difficulties in the operation and location of the drop handle can lead to accidents resulting in damage or operator injury.

Therefore, it can be seen that it would be desirable to provide a means of releasing the coupling apparatus of a fifth wheel that is easily accessible to the operator and which can be operated in a safe and effective manner either during the day or at night and in all weather conditions.

SUMMARY OF THE INVENTION

It is the primary objective of the present invention to provide a mechanism by which the coupling devices employed in conjunction with fifth wheels can be disengaged by the operator from a position that does not require reaching over the drive tires or under the body of the trailer.

It is an additional objective of the present invention to provide such a mechanism by which the coupling devices employed in conjunction with fifth wheels can be disengaged from a more remote position and at a reduced amount of effort thereby enhancing the safety of the operator during this procedure.

It is a further objective of the present invention to provide such a mechanism by which the coupling devices employed in conjunction with fifth wheels can be easily disengaged in adverse conditions such as those that result in the accumulation of snow, ice, or mud on the coupler release mechanism.

It is a still further objective of the present invention to employ such a mechanism by which the coupling devices employed in conjunction with fifth wheels can be easily disengaged even in circumstances where the components of the coupler release mechanism have become worn or damaged causing sticking or other difficulty in operation.

These objectives are accomplished by the use of a fifth wheel coupler release apparatus which is made up of a handle assembly and a release L-bracket. These two components are mounted on the frame of an over the road tractor in such a location as to provide the operator with easy access to the operation of the vehicle's fifth wheel's kingpin release mechanism. This configuration allows the operator to disengage the coupler of the fifth wheel in a more effective and efficient manner.

The fifth wheel is the mechanism employed in the trucking industry to pivotally attach a semi trailer to a tractor. To accomplish this, the fifth wheel is typically mounted to the frame of the tractor above the rear drive wheels in a location that is easily accessible to the kingpin extending downward from the lower forward surface of the trailer. This allows the rear end of the tractor to be maneuvered into a position so that the kingpin will engage and lock into the fifth wheel and secure the two together.

The fifth wheel is a circular apparatus that is mounted to the frame of the tractor in such a manner so that it is capable of pivoting along its central lateral axis. This pivoting allows the connection between the tractor and the trailer to flex to compensate for elevation changes in the surface of a road such as hills or bumps. Additionally, the rear portion of the circular upper surface of the fifth wheel is equipped with an open kingpin slot that longitudinally bisects it. The opening of the kingpin slot is also wider at its most rearward end. The positioning and manner of construction of the kingpin slot serves to direct the kingpin of the trailer into the proper position within the fifth wheel during the attachment process.

The coupling mechanism of the fifth wheel operates to lock the trailer's kingpin by the use of a pivoting jaw mechanism. While the actual design of the locking mechanism varies between manufacturers and the specific purposes of the fifth wheel, their general manner of operation is very similar. All contain spring loaded jaw members and a locking and release mechanism. Additionally, the locking and release mechanism is typically controlled by a drop handle that extends out from the side of the fifth wheel.

The present invention is designed to operate in conjunction with a fifth wheel and the original drop handle as an additional mechanism that may be employed to release the coupler. To accomplish this, the present invention employs a release L-bracket that is pivotally attached to an appropriate location within the fifth wheel. This attachment is formed at or near the point of the kingpin L-bracket where it makes the bend to form the sides of the L. The pivotal positioning is configured so that the short side of the kingpin L-bracket, or the engagement arm, can engage the release mechanism and so that its longer side, or the lever arm, can be engaged by the invention's handle assembly.

The handle assembly of the present invention is the component that extends out from the fifth wheel and into an easily accessible position. The handle assembly, in this embodiment of the present invention, is made up of a shaft, a handle, and an inner shaft. The handle provides the operator with a secure point from which he can grasp and manipulate the present invention to actuate the release mechanism of the fifth wheel. The shaft and inner shaft are slidably joined by the use of an adjustment coupler. This configuration allows the overall length of the handle assembly to be varied thereby allowing the use of the present invention in any number of varying applications.

The most forward end of the inner shaft is also equipped with a pivot joint which provides for its pivotal mounting to the outer end of the lever arm of the kingpin L-bracket. This connection allows the handle assembly and the release L-bracket to vary their positions with respect to one another while providing the attachment necessary for the operation of the present invention.

The end of the handle assembly to which the handle itself is attached is slidably attached to the frame of the tractor by the use of the handle guide. The handle guide is essentially a frame apparatus having a body with a centralized guide hole. This guide hole allows the shaft of the handle assembly to be passed through the handle guide in a slidable manner and, while illustrated as circular, can be shaped in any desired manner such as circular, oval, rectangular, or square. This method of securing the handle assembly allows it to freely move in a longitudinal manner while securing it in the desired position with respect to the tractor frame, the semi trailer, and the fifth wheel itself.

Thus, with the present invention attached to a fifth wheel, the pulling on the handle assembly pivots the kingpin L-bracket around its mounting to the fifth wheel causing the engagement arm to articulate the couple release apparatus. This disengages the lock jaws from the kingpin allowing the semi trailer to be removed from the tractor.

The use of the present invention makes this procedure much easier than was previously possible in two ways. First, the use of the handle assembly to position the handle in an accessible position away from the drive wheels and out from under the trailer allows the operator to disengage the coupling device without having to overcome these obstacles. This advantage is most obvious in adverse circumstances such as cold, wet, or icy weather conditions. Second, the design of the kingpin L-bracket creates more leverage at the critical point of the release coupler thereby making it easier to overcome any resistance in its operational components and requiring less effort in all operational modes. This is especially significant in circumstances where the release coupler is not functioning properly due to wear or interference from foreign objects.

An additional embodiment of the present invention is contemplated which employs a handle guide arm in place of the above described guide body to position and retain the handle assembly in the desired accessible position. In the accomplishment of this, the handle guide arm attaches to the fifth wheel at the pivot pin that secures it to the tractor frame and allows the necessary pivoting action. From this point of attachment, the handle guide arm extends forward along the tractor frame to terminate at the arm guide body. The handle assembly then passes through the arm guide body in the same manner as described above for the previous embodiment of the present invention thereby positioning the handle in the desired location.

Additionally, this embodiment of the present invention, as well as the previous one, may be equipped with a locking point which serves to lock the handle assembly into position relative to the arm guide body. The purpose of the locking point is to provide the operator with a mechanism that ensures that the fifth wheel is indeed in the locked position. The use of this feature eliminates the possibility of a false lock where the fifth wheel appears to be locked but is in fact not. Thus, the use of the locking point adds an additional safety feature that is not present in other mechanisms.

The attachment of the handle guide arm to the fifth wheel is accomplished through the use of a pivot pin hole through which the pivot pin is passed and by the guide arm attachment which ties it to the fifth wheel frame. From the pivot pin hole, the arm body extends forward to a step down which lowers it from the level of the attachment to the level of the tractor frame. From the step down, the horizontal arm body and vertical arm rail extend all the way forward to the arm guide body. The arm guide body is also equipped with a arm guide hole through which the handle assembly passes. Finally, this embodiment of the present invention does not require the use of an adjustable length handle assembly that is employed with the previous embodiment. This is because the entirety of the invention moves forward and rearward as the relative position of the fifth wheel is altered in a longitudinal manner.

A further embodiment of the present invention is contemplated that employs a high leverage release handle apparatus. The high leverage release handle apparatus replaces and allows for a greater degree of force to be placed on the jaw release mechanism without requiring more effort on the part of the operator.

The high leverage release handle apparatus attaches to the tractor frame in a position that is just forward of the fifth wheel. From this point of attachment, the high leverage release handle apparatus extends forward to a point were the high leverage handle can be positioned for easy access. The attachment is accomplished by the use of a base comprised of a rearward base that extends forward in a parallel manner with respect to the tractor frame and a forward base.

The forward end of the rearward base attaches to the forward base. The forward base is an L-shaped device in which the shorter portion of the L is attached at a right angle to the rearward base and extends outward therefrom. The longer portion of the L is angled slightly in a diagonally outward manner. This angle is employed so that the handle guide positioned at the terminal end of the forward base can be positioned on an outer edge of the tractor frame.

The rear attachment plate of the high leverage release handle apparatus also provides for the pivotal attachment of the release L-bracket. In this embodiment, however, the release L-bracket is inverted to provide the necessary orientation but in all other respects operates in the same manner as described for the previous embodiments.

The outer end of the release L-bracket provides the point of pivotal attachment for the operational components of this embodiment of the present invention. The first of these, the activation rod, is equipped with a pivot knuckle on either end for the pivotal attachment both to the release L-bracket and to the lower pivot arm of the pivot arm.

From this pivotal attachment, the lower pivot arm extends forward. At its upper end, the lower pivot arm is fixedly attached to the upper pivot arm. Additionally, this attachment is made at the outer terminus of the short portion of the L-shaped forward base. Importantly, the connection between these two components also provides for the pivotal attachment of the pivot arm to that portion of the forward base. This method of construction forms a fulcrum at this point allowing the pivot arm to act as a lever.

From this attachment to the lower pivot arm, the upper pivot arm extends forward in an angled manner that mimics the construction of the base. Additionally, the forward end of the upper pivot arm provides for the attachment of the inner end of the high leverage handle. Finally, from its point of attachment to the upper pivot arm, the handle extends outward passing through the handle guide in the same manner as described for the previous embodiments of the present invention to be located in an easily accessible position for the operator.

A still further embodiment of the present invention is contemplated in which it has been adapted for use with an alternative style fifth wheel. The alternative style fifth wheel is simply a different apparatus employed to pivotally attach a trailer to a semi tractor and, as such, it functions in a very similar manner. The primary difference in the alternative style fifth wheel is in the design of the kingpin release mechanism. Consequently, the design of the present invention must be adjusted to operate with it.

This embodiment of the present invention employs a alternative style release apparatus in place of the release apparatuses of the previous embodiments. The alternative style release apparatus is also very similar to those of the previous embodiments but differs significantly in the way that it attaches to and operates the release mechanism of the alternative style fifth wheel hitch. The lever arm of this embodiment of the present invention pivotally attaches at its terminal end to a pivot point located at the far end of an alternative style fifth wheel hitch. A central portion of the lever arm is then attached to the same release mechanism that the original handle is in any suitable manner. Finally, the forward end of the lever arm is pivotally attached to an alternative style handle which extends outward so that it is positioned in the same manner as described for the previous embodiments.

When the operator of the semi tractor wishes to disengage the alternative style fifth wheel, he simply grasps the alternative style handle and pulls it towards him. This action causes the lever arm to pivot around the pivoting anchor point which in turn forces the release mechanism to be disengaged in the exact manner that would occur with the use of the original handle. Finally, this embodiment of the present invention affords the user with the same positioning and leverage benefits that were described in detail above for the previous embodiment.

For a better understanding of the present invention reference should be made to the drawings and the description in which there are illustrated and described preferred embodiments of the present invention.

DESCRIPTION OF THE DRAWINGS

FIG. 2 is a top elevation cutaway view of a typical fifth wheel illustrating the position and manner of attachment of the kingpin L-bracket component of the present invention when the lock jaws are engaged to the kingpin.

FIG. 3 is a top elevation cutaway view of the fifth wheel of FIG. 2 illustrating the position of the kingpin L-bracket component of the present invention when the lock jaws are disengaged from the kingpin.

FIG. 14 is a side elevation view of the alternative embodiment of the present invention of FIG. 13.

FIG. 15 is a front elevation view of the alternative embodiment of the present invention of FIG. 13.

FIG. 17 is a top elevation view of the additional alternative embodiment of the present invention illustrating its general manner of construction and its position when th fifth wheel is unlocked.

FIG. 18 is a top elevation view of the additional alternative embodiment of FIG. 17 which illustrates its general manner of construction and its position when th fifth wheel is locked.

DESCRIPTION OF THE PREFERRED EMBODIMENT

Figure 1:
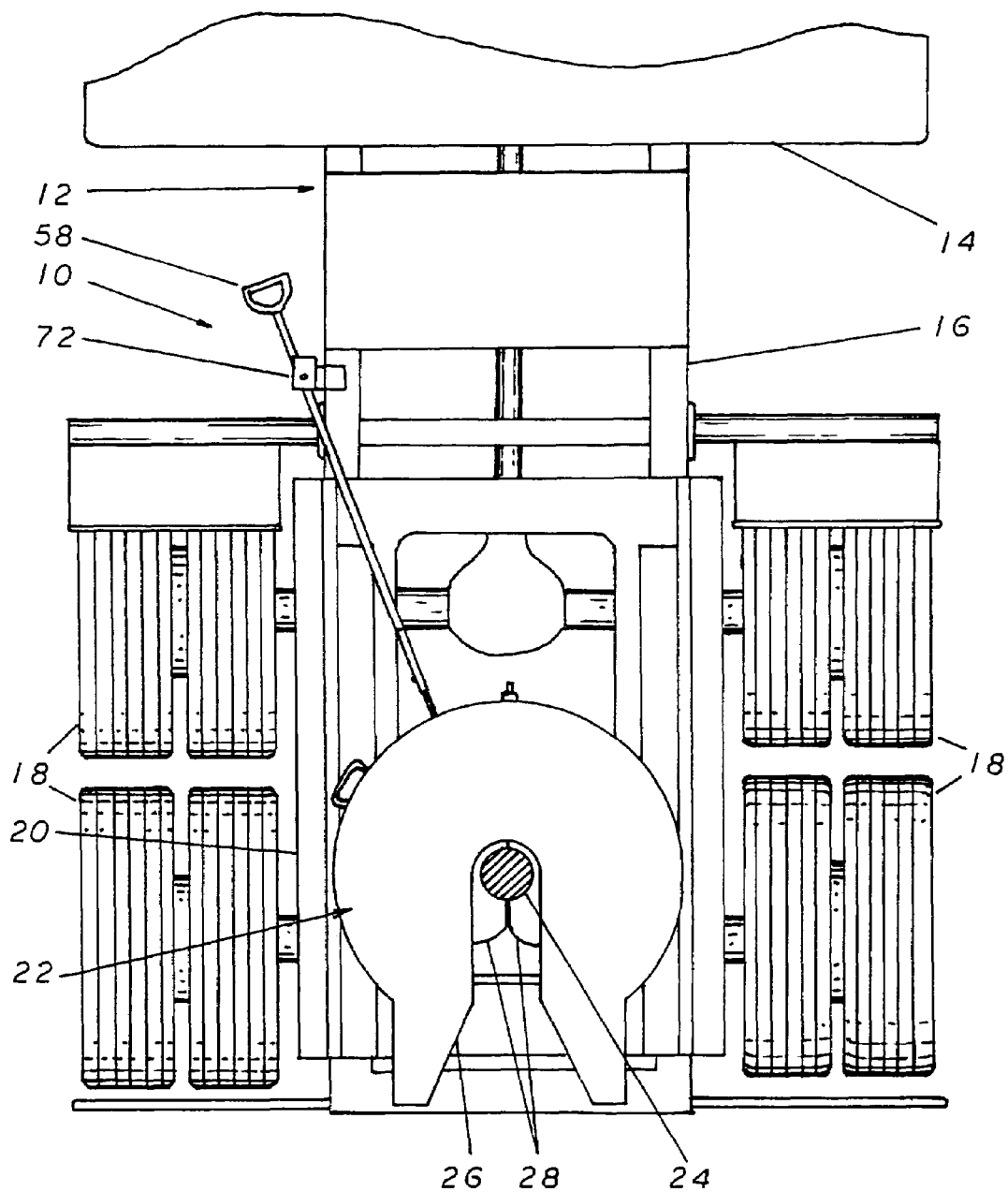
FIG. 1 is a top elevation view of the rear portion of a typical over the road tractor having the present invention attached to the vehicle's fifth wheel and illustrating its position relative to the components of the tractor and fifth wheel.

Referring now to the drawings, and more specifically to FIG. 1, the fifth wheel coupler release apparatus 10 is employed in conjunction with the fifth wheel 22 of a typical over the road tractor 12. The fifth wheel 22 is the component of this vehicle used to pivotally join a semi trailer to the tractor 12. To accomplish this, the fifth wheel 22 is mounted to the tractor frame 16 in a position above the rear drive wheels 18 on a fifth wheel frame 20. This provides a means by which the kingpin 24 mounted to the forward lower surface of the trailer can be secured by the fifth wheel 22.

To accomplish this connection, the fifth wheel 22 is equipped with an open kingpin slot 26 which longitudinally bisects the rearward half of the fifth wheel 22. The kingpin slot 26 provides a means by which the kingpin 24 can be directed to the center of the fifth wheel 22 where it can be engaged by the internal lock jaws 28. The lock jaws 28 then can engage the kingpin 24 to lock the trailer to the tractor 12. The fifth wheel frame 20 is also commonly adjustable in the longitudinal axis to provide a mechanism to adjust the relationship between the tractor 12 and the semi trailer.

The present invention is mounted to the tractor 12 so that its handle 58 is positioned in a generally open area behind the cab 14 of the tractor 12 and in front of the rear drive wheels 18. To accomplish this positioning, the present invention is mounted to the fifth wheel 22 at its rearward end and to the tractor frame 16 by the use of the handle guide 72. This configuration provides the operator of the tractor 12 with easier access to release the locking mechanism of the fifth wheel 22 than was previously available by the use of the drop handle 46 of the fifth wheel 22.

The construction of the fifth wheel 22 and the operation of its jaw release mechanism 29 are further detailed in FIGS. 2 and 3. The kingpin 24 jaw release mechanism 29 is contained within the fifth wheel 22 and contains the primary components: the lock jaws 28, the jaw yoke 40, the release cam 34, and the drop handle 46. It must be noted that the illustrations represent the most common configuration of the fifth wheel 22 and its jaw release mechanism 29. This is not to be construed to be the only configuration with which the present invention can be used, but rather is detailed to illustrate its manner of operation. Additionally, all the jaw release mechanisms 29 used in this application function in substantially similar manners and so the general principles of the operation of the present invention will be the same irrespective of the exact type of jaw release mechanism 29 employed.

In this configuration, the lock jaws 28 of the fifth wheel 22 are centrally positioned at the terminal forward end of the kingpin slot 26. Each of the two lock jaws 28 are pivotally attached to the body of the fifth wheel 22 at their out and upper corners at the jaw pivots 30. This manner of connection allows the lower portions of the lock jaws 28 to pivot outward thereby creating an open space into which the kingpin 24 can either enter or exit. Additionally, the upper edges of the lock jaws 28 are tied together by the use of a jaw spring 32. The jaw spring 32 is biased towards contraction which in turn places an outward force on the lower ends of the lock jaws 28. This manner of construction means that if unrestrained, the lock jaws 28 move to the open position.

The component of the fifth wheel that is employed to restrain this movement is the jaw yoke 40. In this configuration, the jaw yoke 40 is an open U-shaped device which is slidably mounted within the fifth wheel 22 so that, when it is deployed in the downward position, it encases the lock jaws 28 thereby holding them in the closed position (FIG. 2). Conversely, when the jaw yoke 40 is retracted, the lock jaws 28 are then free to rotate outward into the open position. This then allows the kingpin 24 to be moved out of the engaged position (FIG. 3) allowing the trailer to be disengaged from the tractor 12. Finally, the lower ends of the jaw yoke 40 are equipped with a pair of yoke points 42 which facilitate the movement of the jaw yoke 40 along the outside of the lock jaws 28 and which recede into the depressions on the outer surfaces of the lock jaws 28 known as the pivot notches 44.

The motion of the jaw yoke 40 is controlled by the release cam 34. The release cam 34 is a pivotally mounted device that is connected to the jaw yoke 40 on its lower end and, in the original configuration, to the drop handle 46 on its outer side. Additionally, the inner portion of the release cam 34 is equipped with a pin slot 38 which in turn allows for the positioning of the release pin 36. The release pin 36 both secures the release cam 34 and allows for its pivotal motion during the operation of the fifth wheel's 22 jaw release mechanism 29. When the drop handle 46 is engaged, it slides the release cam 34 along the release pin 36 by means of the pin slot 38. This motion in turn raises the jaw yoke 40 which allows the lock jaws 28 to open as previously described. Finally, the fifth wheel 22 is also equipped with a lock indicator 48 (which also functions as an adjustment for the lock mechanism) extending out the upper end of the fifth wheel 22 which moves inward and outward to give the operator a clear indication of the status of the jaw release mechanism 29. Additionally, the lock indicator 48 also provides the operator with a mechanism by which the locking mechanism of the fifth wheel 22 can be adjusted to ensure optimal performance. The use of this device ensures that the operator will make no mistakes as to the status of the fifth wheel 22 ensuring safe operations.

These two Figures also illustrate the manner in which the release L-bracket 50 component of the present invention engages the components of the fifth wheel 22 and its manner of operation. The release L-bracket 50 is an L-shaped apparatus which is pivotally mounted to the fifth wheel 22 by the use of the bracket pivot 52. Additionally, the release L-bracket 50 is equipped with a pair of release cam tabs 53 which engage the release cam 34 by extending upward and clipping on its outside edges. This method of mounting the release L-bracket 50 allows it to not only engage the jaw release mechanism 29 but also to supplant the operations originally accomplished by the drop handle 46.

The release L-bracket 50 has two primary components, the engagement arm 54 and the-lever arm 66. The engagement arm 54 constitutes the shorter side of the L-shape and is the component of the present invention which is used to articulate the jaw release mechanism 29. In the accomplishment of this function, the engagement arm 54 extends down the outside edge of the release cam 34. The lever arm 66 constitutes the component of the invention which is pivotally connected to the remaining components and which is employed to place the opening leverage on the fifth wheel's jaw release mechanism 29. This is accomplished by placing a longitudinal force from the handle assembly 59 of the present invention on to the outer end of the lever arm 66 of the release L-bracket 50. This force causes the release L-bracket 50 to pivot around the bracket pivot 52 which in turn forces the engagement arm to articulate the release cam 34. The articulation of the release cam 34 serves to open the lock jaws 28 in the exact same manner as described above in reference to the drop handle 46.

Figure 4:
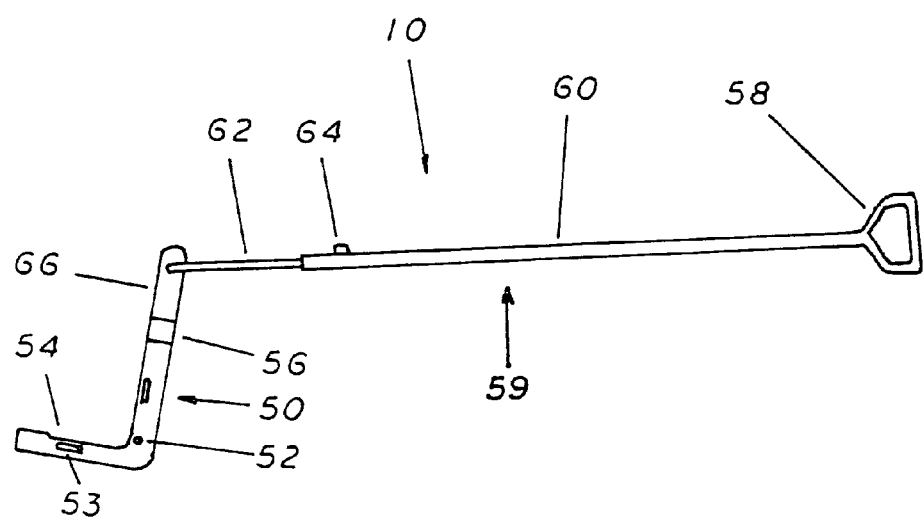
FIG. 4 is a top elevation view of the present invention illustrating the configuration of the handle assembly and kingpin L-bracket.
Figure 5:
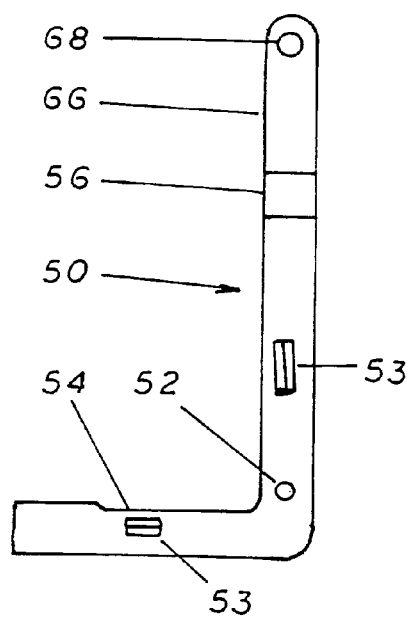
FIG. 5 is a top elevation view of the kingpin L-bracket component of the present invention illustrating its general manner of construction.
Figure 6:
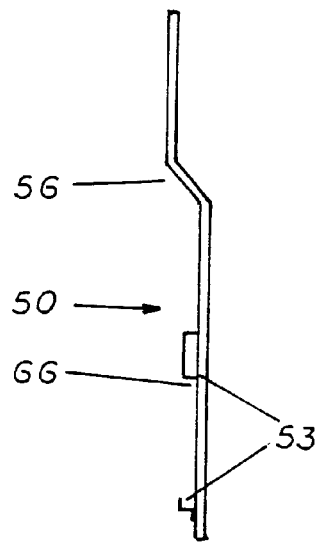
FIG. 6 is a side elevation view of the kingpin L-bracket component of the present invention of FIG. 5 illustrating its general manner of construction.

The manner of construction of the present invention and its release L-bracket 50 are further illustrated in FIGS. 4, 5, and 6. As previously stated, the present invention is made up of a handle assembly 59 and the release L-bracket 50. The handle assembly 59 is the component of the present invention which provides for the placement of the handle 58 in an accessible location. The handle assembly itself is made up of a shaft 60, a handle 58, an inner shaft 62, and an adjustment coupler 64. The handle is employed to operate the present invention in place of the fifth wheel's 22 original equipment. The shaft and inner shaft serve to extend the placement of the handle 58 as described above and to pivotally attach to the release L-bracket at the inside end of the inner shaft 62. Lastly, the adjustment coupler 64 serves to slidably attach the inner shaft 62 to the primary shaft 60.

The release L-bracket 50 is an L-shaped device having a lever arm 66 making up the long side of the L and a engagement arm 54 making up the short side. Additionally, the bend of the L is equipped with a bracket pivot 52 which is employed to pivotally attach the release L-bracket 50 to the appropriate location on the fifth wheel 22. The outer end of the lever arm 66 is equipped with a handle attachment hole 68 which provides for the pivotal attachment of the handle assembly 59 of the present invention. Finally, the central portion of the lever arm 66 also incorporates a offset step 56 which may be employed to alter the horizontal position of the outer end of the lever arm 66 in relation to the fifth wheel 22. The offset step 56 allows the release L-bracket 50 to function properly without interference from any components of the fifth wheel 22.

Figure 7:
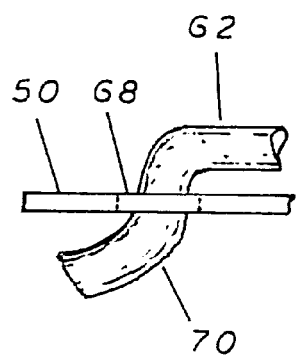
FIG. 7 is a side elevation view of the connection between the handle assembly and kingpin L-bracket components of the present invention illustrating the manner by which the pivotal connection is made.

The pivotal connection of the handle assembly 59 to the release L-bracket 50 is further detailed in FIG. 7. This pivotal connection is accomplished through the use of pivot hook 70 located at the very terminal end of the inner shaft 62. The pivot hook 70 is simply a sharp bend in the terminal end of the inner shaft 62 which is fed through the handle attachment hole 68 of the release L-bracket 50. The design of the pivot hook 70 ensures that when the inner shaft 62 is in a horizontal position it cannot be pulled back through the handle attachment hole 68 ensuring a secure yet pivotal attachment.

Figure 8:
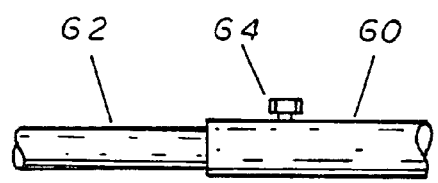
FIG. 8 is a side elevation view of the central portion of the handle assembly of the present invention illustrating the configuration of the slidable connection between the shaft and inner shaft components.

The manner of design and operation of the adjustment coupler 64 component of the handle assembly 59 are further illustrated in FIG. 8. The adjustment coupler 64 is the component of the handle assembly 59 which secures the inner shaft 62 to the shaft 60. This is accomplished by first inserting the inner end of the inner shaft 62 inside the open end of the shaft 60. Additionally, this is a slidable connection meaning that the overall length of the handle assembly 59 can be varied to perfectly fit any number of differing configurations of vehicles and fifth wheels 22. Once the desired length has been obtained, the adjustment coupler 64 can then be tightened to secure the connection between the shaft 60 and inner shaft 62.

Figure 9:
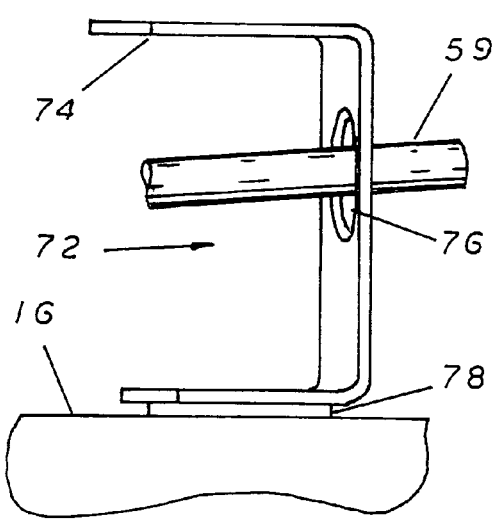
FIG. 9 is a front elevation view of the handle guide component of the present invention illustrating the manner by which it engages and retains the handle assembly.
Figure 10:
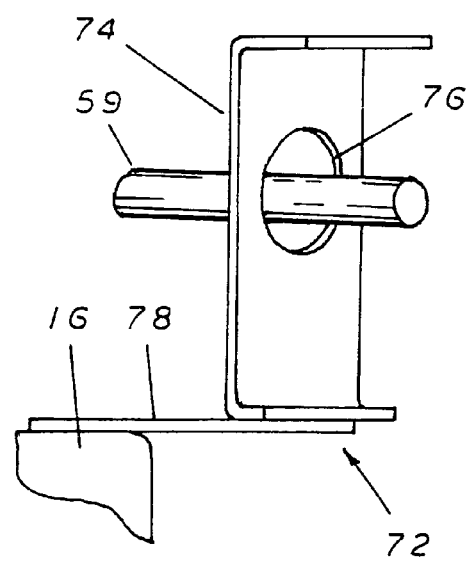
FIG. 10 is a side elevation view of the handle guide of FIG. 9.
Figure 11:
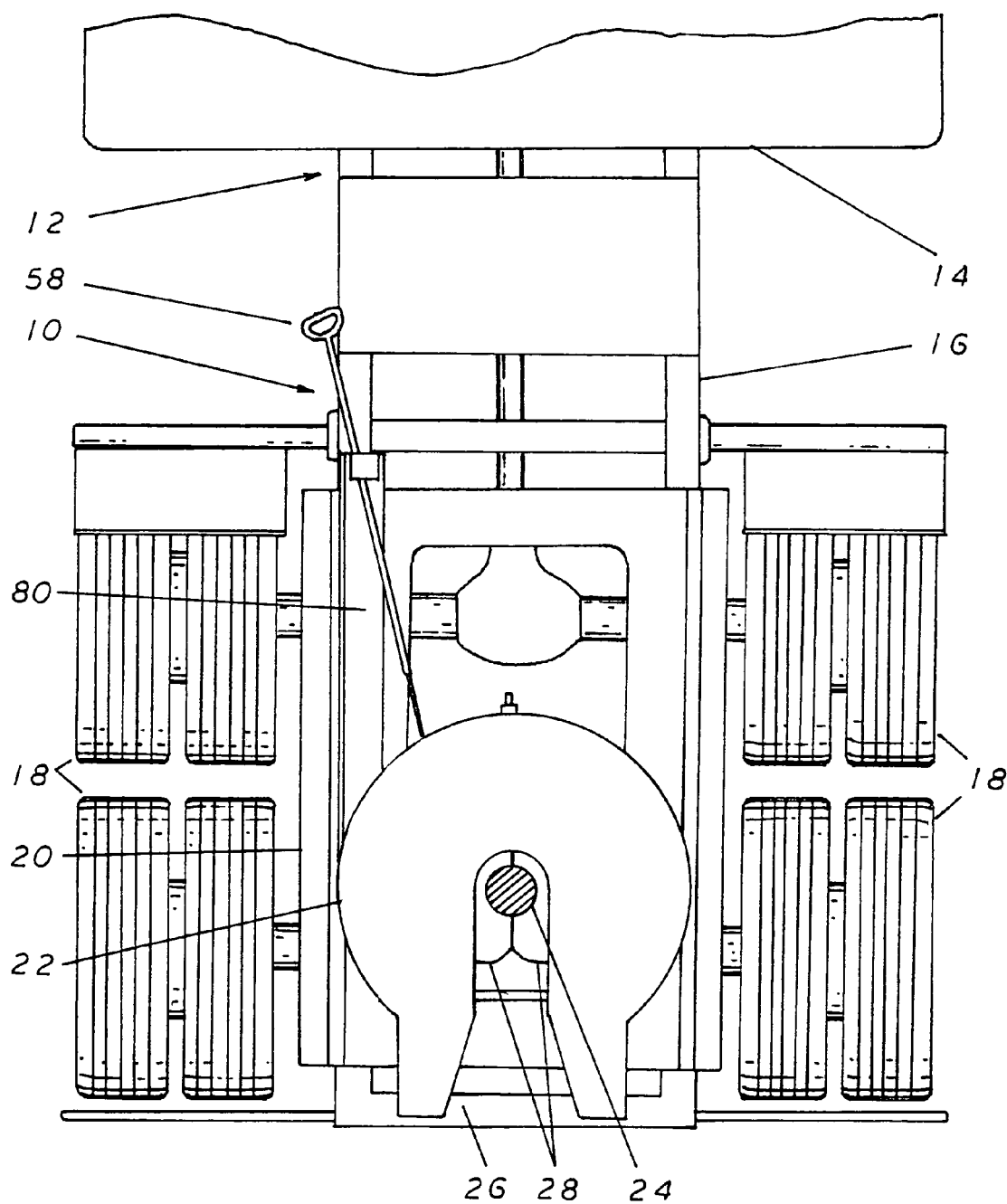
FIG. 11 is a top elevation view of the rear portion of a typical over the roar tractor having an alternative embodiment of the present invention attached to the vehicle's fifth wheel and illustrating its position relative to the components of the tractor and fifth wheel.
Figure 12:
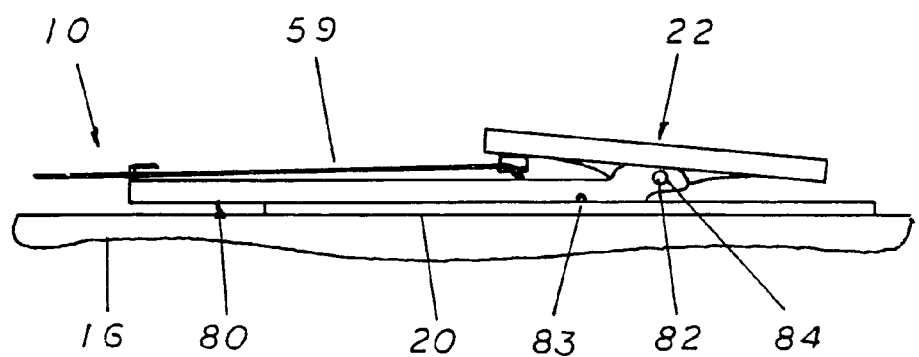
FIG. 12 is a side elevation view of the alternative embodiment of the present invention of FIG. 11 and illustrating its manner of attachment to the fifth wheel.
Figure 13:
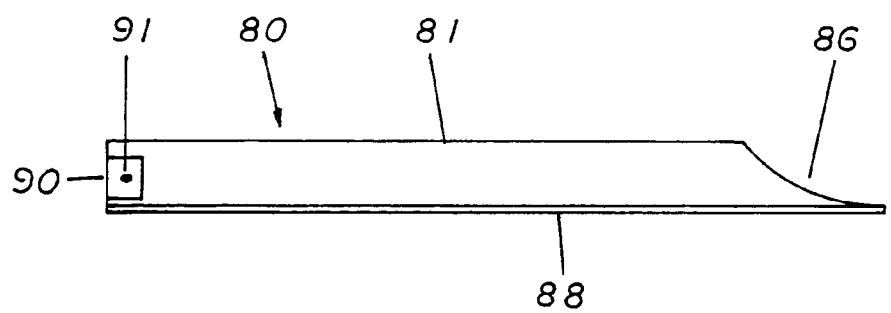
FIG. 13 is a top elevation vies of the alternative embodiment of the present invention illustrating its general manner of construction.

Finally, the construction and manner of operation of the handle guide 72 are further detailed in FIGS. 9 and 10. The handle guide 72 is the component of the present invention which serves to tie the handle assembly 59 to the tractor frame 16. In the accomplishment of this function, the handle guide 72 is made up of a guide body 74 and an attachment plate 78. The attachment plate 78 serves to attach the guide body 74 in the desired location of the tractor frame 16. The guide body's 74 primary function is to position a guide hole 76 in a location so that the handle assembly 59 can be secured in the correct position. The guide hole 76 is simply a hole through the guide body 74 which allows the handle assembly 59 to freely slide in a longitudinal manner while securely restraining it in a lateral manner. Additionally, in the illustrations the guide hole 76 is depicted as being circular but it could be any shape including square, oval, circular, or rectangular. This configuration functions to secure the handle assembly 59 to ensure the proper operation of the present invention.

An additional embodiment of the present invention is contemplated and illustrated in FIGS. 11, 12, 13, 14, and 15, which employs a handle guide arm 80 in place of the above described guide body 74 to position and retain the handle assembly 59 in the desired accessible position. In the accomplishment of this, the handle guide arm 80 attaches to the fifth wheel 22 at the pivot pin 82 and to the fifth wheel frame 20 by use of the guide arm attachment 83. The pivot pin 82 is the component of the fifth wheel 22 that secures it to the tractor frame 16 and allows the necessary pivoting action. From the point of attachment to the fifth wheel 22, the arm body 81 of the handle guide arm 80 extends forward along the tractor frame 16 to terminate at the arm guide body 90. The handle assembly 59 then passes through the arm guide body 90 in the same manner as described above for the previous embodiment of the present invention thereby positioning the handle assembly 59 in the desired location.

Additionally, this embodiment of the present invention, as well as the previous one, may be equipped with a locking point 91 which serves to lock the handle assembly 59 into position relative to the arm guide body 90. The purpose of the locking point 91 is to provide the operator with a mechanism that ensures that the fifth wheel 22 is indeed in the locked position. The use of the locking point 91 eliminates the possibility of a false lock where the fifth wheel 22 appears to be locked but is in fact not. Thus, the use of the locking point 91 adds an additional safety feature that is not present in other fifth wheel 22 locking mechanisms.

The attachment of the handle guide arm 80 to the fifth wheel 22 is accomplished through the use of a pivot pin hole 84 through which the pivot pin 82 is passed. Additionally, the forward end of the arm body 81 is equipped with a fifth wheel notch 86 which facilitates its fit to the fifth wheel 22. From this point of attachment, the arm body 81 extends forward to a step down 94 which lowers it from the level of the attachment to the level of the tractor frame 16. From the step down 94, the horizontal arm body 81 and vertical arm rail 88 extend all the way forward to the arm guide body 90. Additionally, the arm guide body 90 is equipped with an arm guide hole 92 through which the handle assembly 59 passes.

Additionally, in the illustrations the arm guide hole 92 is depicted as being circular but it could be any shape including square, oval, circular, or rectangular. Finally, this embodiment of the present invention does not require the use of an adjustable length handle assembly 59 that is employed with the previous embodiment. This is because the entirety of the invention moves forward and rearward as the relative position of the fifth wheel 22 is altered in a longitudinal manner.

Figure 16:
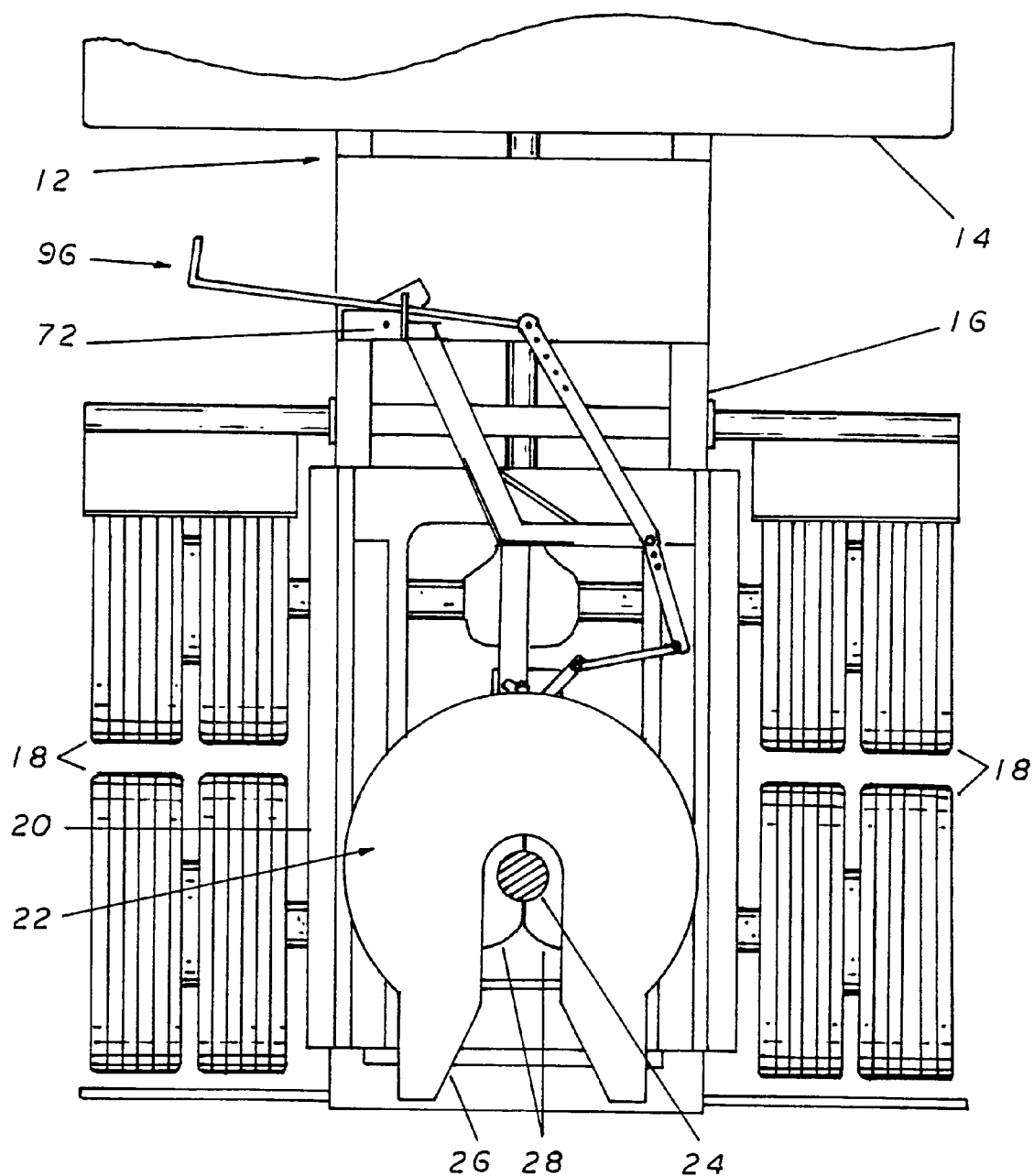
FIG. 16 is a top elevation view of the rear portion of a typical over the roar tractor having an additional alternative embodiment of the present invention attached to the vehicle's fifth wheel and illustrating its position relative to the components of the tractor and fifth wheel.

A further embodiment of the present invention is contemplated and is illustrated in FIGS. 16, 17, and 18. This embodiment of the present invention employs a high leverage release handle apparatus 96 which makes the unlocking and locking of the fifth wheel 22 easier especially in situations where such actions are difficult because of ware or impediments. The high leverage release handle 96 apparatus replaces the handle assemblies 59 of the previous embodiments in a manner that provides the above described benefits of the location and ease of access while additionally allowing for a greater degree of force to be placed on the jaw release 29 mechanism without requiring more effort on he part of the operator.

The high leverage release handle apparatus 96 attaches to the tractor frame 16 in a position that is just forward of the fifth wheel 22 by use of a rear attachment plate 98. From this point of attachment, the high leverage release handle apparatus 96 extends forward to a point were the high leverage handle 110 can be positioned for easy access in a similar manner as described above for the two previous embodiments of the present invention. In accomplishing this, the apparatus has a base 113 that extends forward in a parallel manner with respect to the tractor frame 16. The base 113 consists of a rearward base 114 and a forward base 116.

The most forward end of the rearward base 114 then attaches to the forward base 116. The forward base 116 is an L-shaped device in which the shorter portion of the L is attached at a right angle to the rearward base 114 and extends outward therefrom. The longer portion of the L is angled in a diagonally outward manner so that its forward extending length diverts slightly from the line created by the rearward base 114. This angle is employed so that the handle guide 72 positioned at the terminal end of the forward base 116 can be positioned on an outer edge of the tractor frame 16. This then allows for the beneficial positioning of the high leverage release handle 110 as previously described.

The rear attachment plate 98 of the high leverage release handle apparatus 96 also provides for the pivotal attachment of the release L-bracket 50. As with the previous embodiments of the present invention, the release L-bracket 50 is the component which engages the fifth wheel 22 to activate the jaw release mechanism 29. In this embodiment, however, it is inverted to provide the necessary orientation but in all other respects operates in the same manner as described for the previous embodiments.

The outer end of the release L-bracket 50 provides the point of pivotal attachment for the operational components of this embodiment of the present invention. The first of these is the activation rod 100. The activation rod 100 is equipped with a pivot knuckle 102 on either end which provide for its pivotal attachment both to the release L-bracket 50 and to the lower pivot arm 104 of the pivot arm 103. From this pivotal attachment, the lower pivot arm 104 extends forward in a manner that is roughly parallel to the rearward base 114. At its upper end, the lower pivot arm 104 is fixedly attached to the upper pivot arm 106. Additionally, this attachment is made at the outer terminus of the short portion of the L-shaped forward base 116. Importantly, the connection between these two components also provides for the pivotal attachment of the pivot arm 103 to that portion of the forward base 116. This method of construction forms a central pivot fulcrum 108 at this point allowing the pivot arm 103 to act as a lever.

From this attachment to the lower pivot arm 104, the upper pivot arm 106 extends forward in an angled manner that mimics the construction of the base 113. Additionally, the forward end of the upper pivot arm 106 provides for the attachment of the inner end of the high leverage handle 110. The upper end of the upper pivot arm 106 is also equipped with a plurality of handle adjustment holes 112 which allow the position of attachment of the high leverage handle 110 to be varied with respect to the upper pivot arm to alter the performance characteristics of high leverage release handle apparatus 96. Finally, from its point of attachment to the upper pivot arm 106, the high leverage handle 110 extends outward passing through the handle guide 72 in the same manner as described for the previous embodiments of the present invention to be located in an easily accessible position for the operator.

To operate the releasing function of the lock jaws 28 of the fifth wheel 22 in this embodiment of the present invention, the operator simply grasps the high leverage handle 110 and pulls it towards him. This then causes the pivot arm 103 to rotate around the central pivot fulcrum 108 and pulls the activation rod 100 in an outward manner. This in turn rotates the release L-bracket 50 and activates the jaw release mechanism 29. Conversely, to engage the lock jaws 28 these procedures are reversed allowing for the connection of a semi trailer to the fifth wheel 22.

Figure 19:
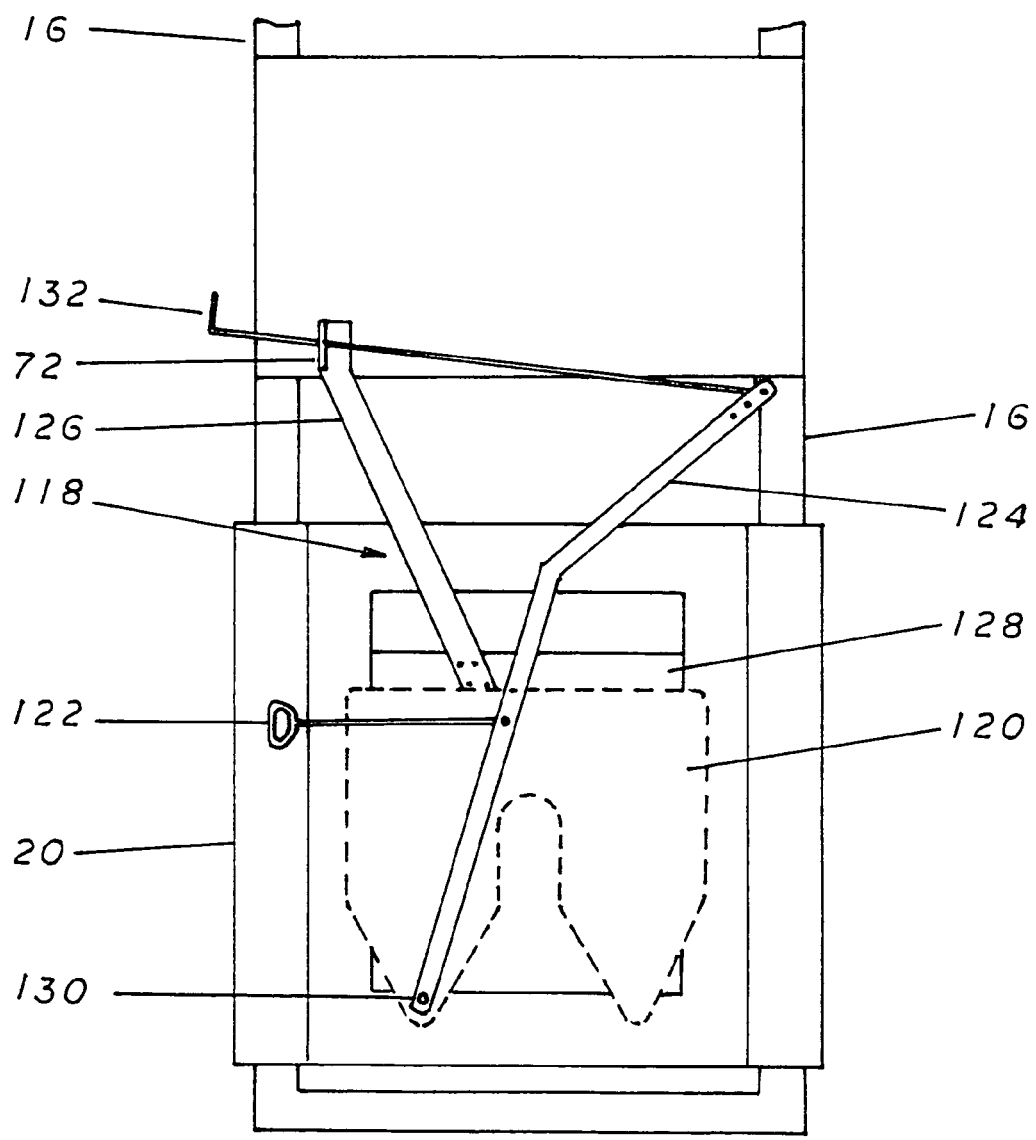
FIG. 19 is a top elevation view of a further embodiment of the present invention illustrating the manner of construction of a coupler release apparatus which has been designed for use with an alternative style fifth wheel.
Figure 20:
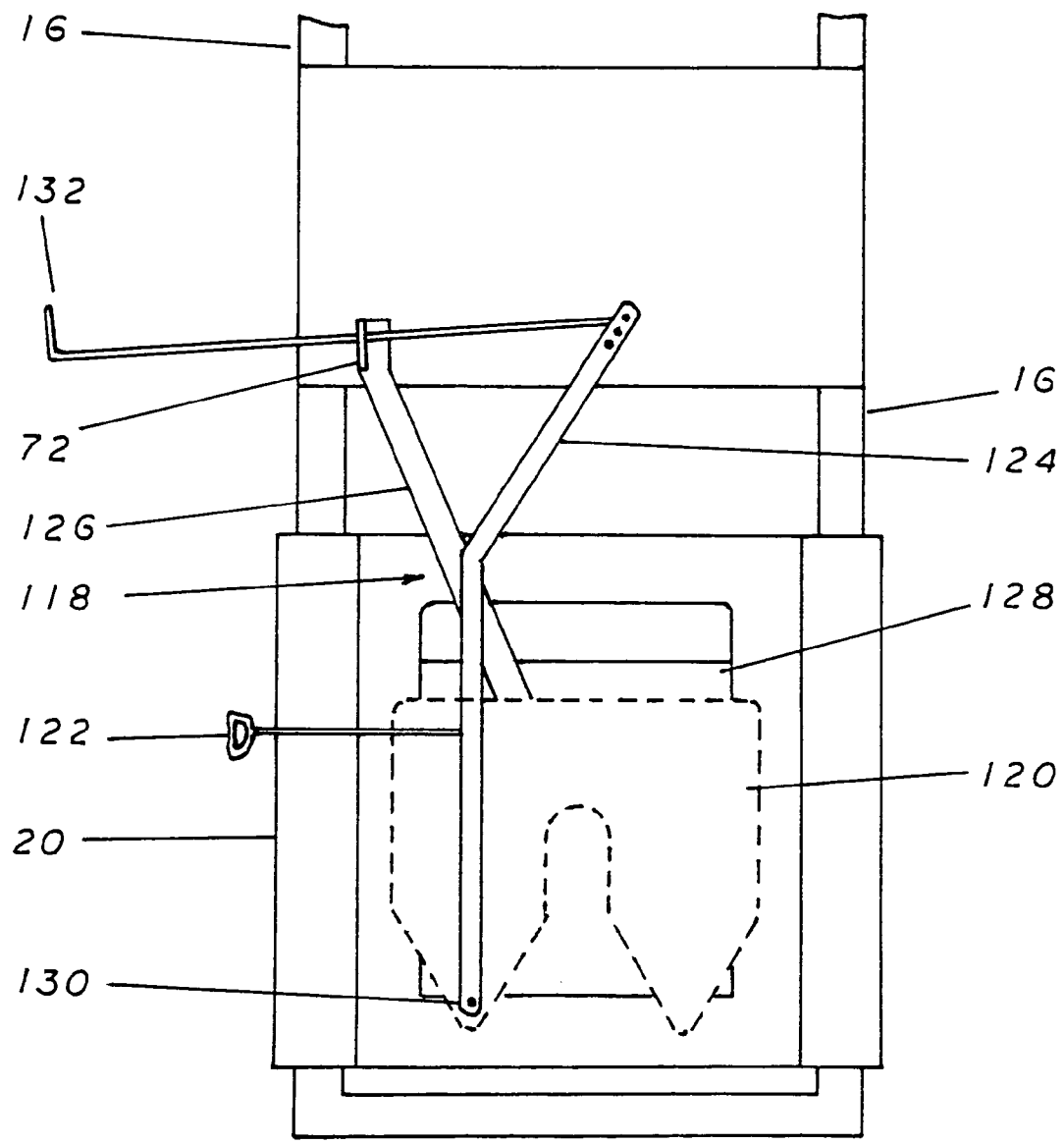
FIG. 20 is a top elevation view of the further embodiment of the present invention of FIG. 19 and illustrating the position of its major components when the release mechanism has been fully activated.

A still further embodiment of the present invention is illustrated in FIGS. 19 and 20. This embodiment contains an alternative style release apparatus 118 which has been specifically designed to be used in conjunction with an alternative style fifth wheel 120. The alternative style fifth wheel 120 is simply a different apparatus employed to pivotally attach a trailer to a semi tractor and, as such, it functions in a very similar manner as described above for the previous embodiments. The primary difference in the alternative style fifth wheel 120 is in the design of the kingpin release mechanism. Consequently, the design of the present invention must be adjusted to operate with it.

This embodiment of the present invention employs an alternative style release apparatus 118 in place of the release apparatuses of the previous embodiments. The alternative style release apparatus 118 is very similar to those of the previous embodiments but differs significantly in the way that it attaches to and operates the release mechanism of the alternative style fifth wheel hitch 120. The leverage arm 124 of this embodiment of the present invention pivotally attaches at its terminal end to a pivot anchor point 130 located at the far end of an alternative style fifth wheel hitch 120. A central portion of the leverage arm 124 is then attached to the same release mechanism that the original handle 122 is in any suitable manner. Finally, the forward end of the leverage arm 124 is pivotally attached to an alternative style handle 132 which extends outward so that it is positioned in the same manner as described for the previous embodiments.

The alternative style release apparatus 118 is attached to the top of the tractor frame 16 by the use of a guide mount bracket 126 which is fixedly attached to a cross-member 128 of the tractor frame 16. The guide mount bracket 126 extends forward from this mounting in a diagonal manner so that it terminates close to the outer edge of the tractor frame 16 in the desired location. Additionally, the most forward portion of the guide mount bracket 126 is equipped with a handle guide 72 which operates to control the lateral positioning of the alternative handle 132 in the same manner as described above for the previous embodiments of the present invention.

When the operator of the semi tractor wishes to disengage the alternative style fifth wheel 120, he simply grasps the alternative style handle 132 and pulls it towards him. This action causes the leverage arm 124 to pivot around the pivot anchor point 130 which in turn forces the release mechanism to be disengaged in the exact manner that would occur with the use of the original handle 122. Finally, this embodiment of the present invention affords the user with the same positioning and leverage benefits that were described in detail above for the previous embodiment.

Although the present invention has been described in considerable detail with reference to certain preferred versions thereof, other versions are possible. Therefore, the spirit and scope of the appended claims should not be limited to the description of the preferred versions contained herein.

What is claimed is:

1. A fifth wheel coupler release apparatus for use on a fifth wheel attached to a vehicle frame said fifth wheel having lock jaws for locking about a kingpin, said fifth wheel further having a jaw release cam for selectively opening and closing said lock jaws and a drop handle for controlling said jaw release cam, said fifth wheel coupler release apparatus comprising:

a release bracket having an elongate lever arm portion said release bracket being fixedly attached to said jaw release cam such that an elongate lever arm portion of said release bracket extends beyond said jaw release cam;

said elongate lever arm portion forming a handle attachment hole;

an elongate pivot arm having an upper and lower pivot arm section and central pivot fulcrum pivotally attaching said elongate pivot arm to said vehicle frame; and an activation rod having a first and second end with said first end being pivotally connected to said handle attachment hole and said second end being pivotally attached to said lower pivot arm section.

2. A fifth wheel coupler release apparatus as in claim 1 wherein said release bracket is L shaped with said elongate lever arm portion and a lower engagement arm.

3. A fifth wheel coupler release apparatus as in claim 2 further comprising release cam tabs on said release bracket for fixedly attaching said release bracket to said jaw release cam.

4. A fifth wheel coupler release apparatus as in claim 3 further comprising a high leverage handle pivotally attached to said upper pivot arm section.

5. A fifth wheel coupler release apparatus as in claim 4 further comprising a handle guide fixedly attached to said vehicle frame, said handle guide forming a guide hole for holding said high leverage handle.

* * * * *